UNITED STATES PATENT OFFICE.

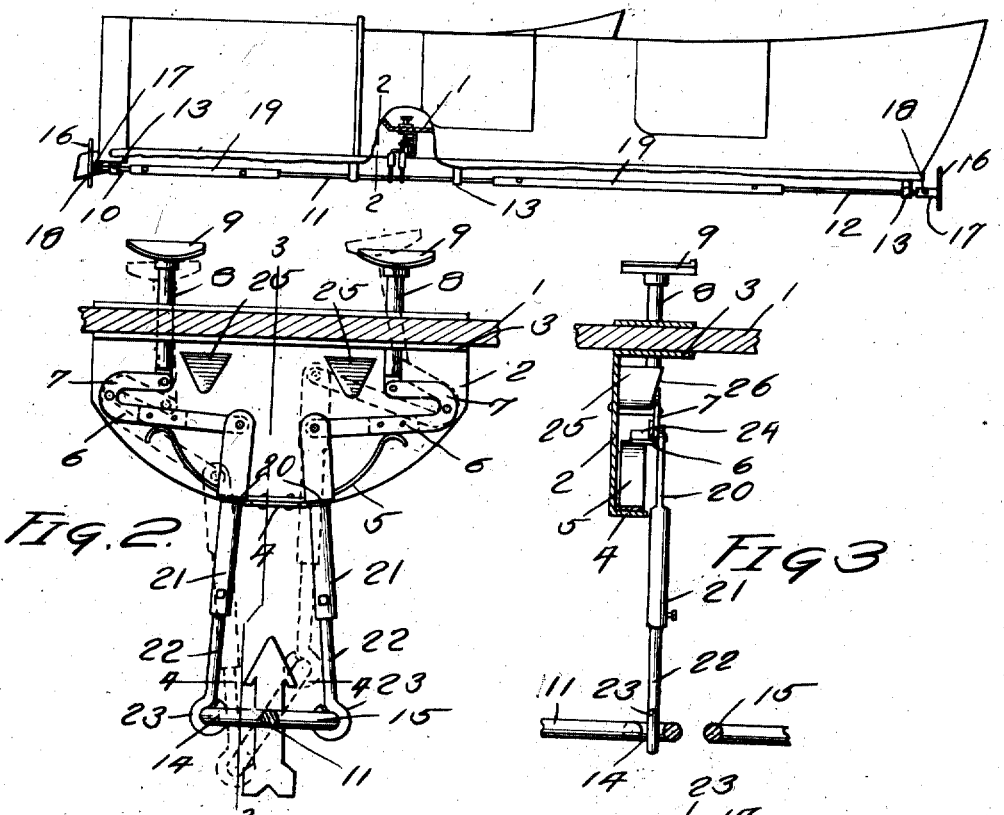

ROBERT C. NIST, OF CANTON, OHIO.

AUTOMOBILE DIRECTION-INDICATOR.

1,249,463.  Specification of Letters Patent.  Patented Dec. 11, 1917.

Application filed December 29, 1915. Serial No. 69,216.

*To all whom it may concern:*

Be it known that I, ROBERT C. NIST, a citizen of the United States, residing at Canton, in the county of Stark, State of Ohio, have invented certain new and useful Improvements in Automobile Direction-Indicators; and I do hereby declare the following to be a full, clear, and exact description of the invention, such as will enable others skilled in the art to which it appertains to make and use the same.

The present invention is directed to improvement in direction indicators for automobiles, or other vehicles, and has for its object to so construct a device of this character as to indicate to pedestrians as well as a following vehicle the direction in which the driver intends to turn.

A further object of the invention is to provide a direction indicator so constructed that the same can be conveniently applied to automobiles of various sizes, and when in place thereon will serve to indicate the direction in which the vehicle is about to travel.

A still further object of the invention is to provide an indicator of this class which can be conveniently applied by the driver and held in its operative position as long as desired.

With these and other objects in view, this invention resides in the novel features of construction, formation, combination and arrangement of parts to be hereinafter more fully described, claimed and illustrated in the accompanying drawing, in which:—

Figure 1 is a side elevation of an automobile, showing the same equipped with the device.

Fig. 2 is a sectional view on line 2—2 of Fig. 1.

Fig. 3 is a sectional view on line 3—3 of Fig. 2.

Fig. 4 is a sectional view on line 4—4 of Fig. 2.

Fig. 5 is a fragmentary front elevation of an automobile equipped with the device.

Fig. 6 is a fragmentary detail elevation of certain parts shown in the position indicated in dotted lines in Fig. 2.

Referring to the drawing 1 indicates the floor of the vehicle and 2 the supporting plate, having its upper end terminating in a flange 3 which is secured to the under surface of the floor in any suitable manner, and its lower edge provided with a shelf 4, to which is fixed the central portion of the bowed spring 5.

Pivotally connected to the plate 2 are oppositely disposed links 6, having their outer ends terminating in curved portions 7, the ends of which are pivotally connected to the lower ends of the rods 8. The rods 8 pass through the flange 3 and through the floor 1, and have their upper ends provided with treadles 9.

The device further consists of shafts 10, 11 and 12, arranged longitudinally of the body of the automobile, and rotatably supported thereunder by hangers 13, the shape of the hanger being subject to change to suit different conditions.

The shaft section 11 is provided with oppositely directed crank arms 14 and 15, normally held horizontally so that the arrows 16 will normally be in vertical positions. The arrows 16 are provided with sleeves 17 having set screws 18 for engaging the ends of the respective shaft sections 10 and 12, said set screws permitting the sleeves to be adjustably secured to the respective shaft sections. The adjacent ends of the shaft sections 10, 11 and 12 are adjustably connected by the sleeves 19, whereby the sections may be adjusted for application to automobiles of different length.

Pivotally connected to the inner ends of the links 6 are the upper ends of the links 20, having their lower ends provided with sleeves 21 in which are adjustably connected rods 22, the lower ends of which are provided with eyes 23 which pivotally engage the crank arms 14 and 15 of the shaft section 11. It will be noted that the spring 5 has its upper ends engaged with the angle brackets 24 which are fixed to the links 6. Thus it will be seen that the spring serves to hold the crank arms 14 and 15 in a normally horizontal position, and at which time the arrows 16 are disposed vertically.

Fixed to the plate 2 and in the path of movement of the links 6 are blocks 25, having their rear faces beveled, as at 26, so that when one of the treadles 9 is depressed, the associated link, when swung upwardly, will engage the inclined face with sufficient friction to hold the link in its raised position, and at which time the shaft sections have been rotated so as to swing the arrows 16 from a vertical position to a horizontal position.

From the foregoing description it will be seen that when the right hand treadle is depressed the crank arm 14 will be swung from a horizontal to a vertical position, thus swinging the arrows to point to the right, and indicating to a following vehicle or to a pedestrian that the automobile is about to turn to the right.

The arrow will be held in this position, due to the frictional engagement between the associated link and block, until the other treadle has been actuated to swing the crank arm 14 to its normal position, after which the spring 5 will hold the links 6 and arrows 16 in their neutral positions, and when in this position it will be indicated that the automobile will continue to travel straight ahead.

When it is the intention of the driver to turn to the left, the crank arm 15 is moved from a horizontal to a vertical position upon actuating the associated treadle 9, and to return the arrows to their normal or vertical position, the other treadle is depressed sufficiently to cause the crank arms to assume a horizontal position.

What is claimed is:—

1. In a direction indicator for vehicles, the combination with the floor of the vehicle, a plate secured to the under surface of the floor and provided with a shelf at its lower end, a shaft extending beneath said floor and having crank portions, oppositely disposed links pivoted to said plate, adjustable connections between said links and the crank portions of said shaft, a spring secured to said shelf and having its ends engageable with said links for maintaining the same in normal positions, and treadles connected to said links for rocking the same about their pivots to adjust said shaft.

2. In a direction indicator for vehicles, the combination with the floor of the vehicle, a plate secured to the under surface of the floor and provided with a shelf at its lower end, a shaft extending beneath said floor and having crank portions, oppositely disposed links pivoted to said plate, adjustable connections between said links and the crank portions, of said shaft, a spring secured to said shelf and having its ends engageable with said links for maintaining the same in normal positions, treadles connected to said links for rocking the same about their pivots to adjust said shaft, and wedging members carried by said plates and arranged in the path of movement of said links to frictionally engage and maintain the same in their adjusted positions.

In testimony whereof, I affix my signature, in the presence of two witnesses.

ROBERT C. NIST.

Witnesses:
GEORGE E. NIST,
ORVILLE L. BUSH.